(No Model.)
J. L. LEEPER
BICYCLE.
No. 420,579. Patented Feb. 4, 1890.
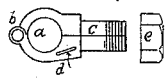
Fig. 1.
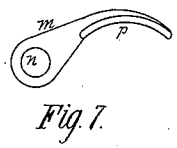
Fig. 7.
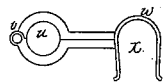
Fig. 10.
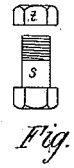
Fig. 2.
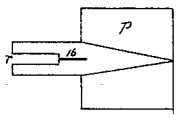
Fig. 8.
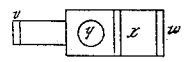
Fig. 11.
Fig. 13.
Fig. 9.
Fig. 12.
Fig. 14.
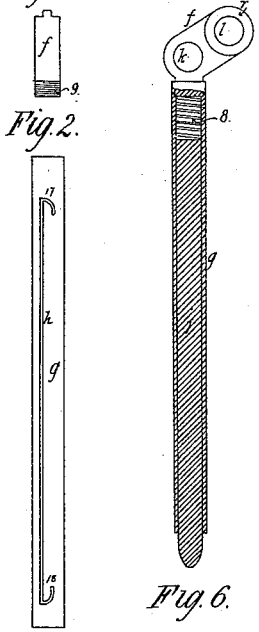
Fig. 6.
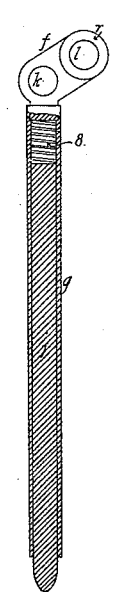
Fig. 3.
Fig. 4.
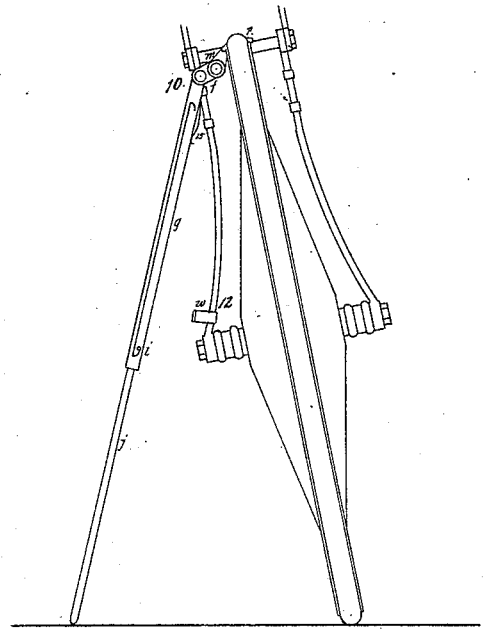
Fig. 5.
WITNESSES:
John Morris Jr.
Charles H. Worden.
James L. Leeper INVENTOR
BY
Watts V. Denny ATTORNEY

UNITED STATES PATENT OFFICE.

JAMES L. LEEPER, OF FORT WAYNE, INDIANA.

BICYCLE.

SPECIFICATION forming part of Letters Patent No. 420,579, dated February 4, 1890.

Application filed July 3, 1889. Serial No. 316,474. (No model.)

*To all whom it may concern:*

Be it known that I, JAMES L. LEEPER, a citizen of the United States, residing at Fort Wayne, county of Allen, and State of Indiana, have invented a new and useful Improvement in Bicycles, of which the following is a full and exact description, reference being had to the accompanying drawings, which are a part of this specification.

My invention relates to improvements in bicycles of every kind and description whatever without regard to the diameter of the wheel or the size of the machine.

The object of my invention is to provide a support or rest for bicycles of every class, so constructed that the machine can be left standing self-locked and self-supported by a device which is fastened to and is made a part of the machine. This object is attained by the mechanism illustrated in the accompanying drawings, in which—

Figure 1 is a clip with a folding hinge and terminating with a thread and nut for fastening the lock-rest to the fork of the bicycle at 10, Fig. 5. Fig. 2 is a top view of the head of the lock-rest terminating in a thread, a side view of which is seen in Fig. 6 as it appears when adjusted in position. Fig. 3 is the outer tube of the lock-rest, showing the slot in which the button $i$ on the inner tube, Fig. 4, works. Fig. 4 is the inner tube of the lock-rest, showing button $i$, which works in slot $h$, tube $g$, Fig. 3. Fig. 5 is a front view of a bicycle with my automatic rest attached and in the position it assumes when the machine is at rest. Fig. 6 is an inside view of a portion of the lock-rest with head $f$, Fig. 2, adjusted to the top of the outer tube of Fig. 3, with the inner tube $j$, Fig. 4, adjusted in tube $g$ and against spring 8. Fig. 7 is a side view of the shoe, which is designed to be adjusted to head $f$, Fig. 6, for the purpose of locking the wheel when at rest. Fig. 8 is a top view of the same device, showing slot $r$ and slot 16. Fig. 9 is a set-screw and nut, which fastens Fig. 7 to head $f$, Fig. 6. Fig. 10 is a top view of a clip with folding hinge $v$ and spring $w$ to be fastened to the fork at 12, Fig. 5, to secure the lower end of the lock-rest when telescoped and not in use. Fig. 11 is a side view of the same device. Fig. 12 is a strap-like device for locking the bicycle, which may be used on those bicycles which have a shoe in front of the fork. Fig. 13 is a spring which throws the lock-rest into position when freed from spring $w$, Fig. 10, as seen in Fig. 5, and is fastened to clip, Fig. 1, at $d$. (See also 15, Fig. 5.) Fig. 14 is an end view of the same spring, showing the concavity of one side so made as to fit closely against tube $g$, Fig. 6.

Similar letters refer to similar parts throughout the several views.

Rod $j$, with spring 8 inclosed in tube $g$, Fig. 6, to which is adjusted head $f$ with spring 15, Fig. 13, and the lock or shoe, Fig. 7, together with clip, Fig. 10, constitute the frame-work of the improvement.

The lock-rest, Figs. 6 and 7, adjusted is securely fastened at the head of the fork, as seen at 10, Fig. 5, either in front or behind the fork, by means of a clip, Fig. 1, which incloses the fork in the opening $a$, Fig. 1, and which passes through the opening $k$, Fig. 6, so that the head $f$, Fig. 6, incloses the clip at $c$, Fig. 1, and is then firmly secured by nut $e$, Fig. 1.

The lock or shoe, Figs. 7 and 8, is fastened to the head $f$, Fig. 6, at $r$ by a clevis-like device, as seen at $r$, Fig. 8, which slips on over the head $f$, Fig. 6, and is then secured by a set-screw, Fig. 9, which passes through the opening $l$ in Fig. 6, and also through the opening $n$ in Fig. 7, and is then rigidly secured by a nut $t$, Fig. 9, as seen at $m$, Fig. 5.

The main portion of the lock-rest, when not in use as a lock and rest, is telescoped, as seen in Fig. 6, and is also fastened to the arm of the fork at 12, Fig. 5, by a clip, Fig. 10, with a folding hinge $v$ and spring $w$, which incloses the arm of the fork in the opening $u$, Fig. 10, firmly fastened by a set-screw at $y$, Fig. 11, and also incloses the lock-rest in the spring $w$ at $x$, Fig. 10.

The outer tube $g$, Fig. 3, is provided with a slit or slot $h$, curved down at top 17 and curved up at bottom 18, Fig. 3. This slot $h$, Fig. 3, is designed for the movement up and down of the button $i$, found on the inner tube, Fig. 4. When the lock-rest is telescoped, as in Fig. 6, the button $i$, Fig. 4, rests in the upper curve of slot $h$ at 17, Fig. 3, and prevents the inner tube from dropping when the machine is in motion.

When this lock-rest is in use, the button $i$ rests in the lower curve of slot $h$ at 18, Fig. 3, the weight of the bicycle holding it in position, as seen at $i$, Fig. 5.

When the rider desires to make use of the lock-rest, he frees it from the spring $w$ in Fig. 5, and the spring 15, Fig. 5, throws the lock-rest out from the fork at the proper angle. He then turns the wheel slightly, and by a slight movement of the button $i$, Fig. 4, allows the inner tube $j$ to drop and form a rest and support for the bicycle, as seen in Fig. 5. At the same time the weight of the machine in this position causes the lock or shoe $m$, Fig. 7, to bear down on the wheel, as seen at P, Fig. 5, thus automatically locking the machine while at rest.

In those bicycles having a shoe in front of the fork an auxiliary device (seen in Fig. 12) may lock the machine when at rest in the following manner: Referring now to Fig. 12, 19 represents the handle-bar, and 20 the brake, of the bicycle. 2 is a metallic hook lined with rubber 3, with a buckle at 4 for fastening strap 5. 6 is a metallic hook, and 7 is a strap to be fastened to the rigging of the saddle when the device is used as a lock. Strap 5 is fastened in buckle 4. Then when hooks 2 and 6 are adjusted, as seen in Fig. 12, the handle-bar 19 and bicycle-brake 20 are drawn nearer together, and thus the bicycle will be locked and so remain until the hooks are removed.

I am aware that prior to my invention such contrivances as a bicycle brace or support have been made for somewhat similar purposes as the above. Therefore I do not claim a bicycle-rest simply as my invention; but What I do claim as my invention, and desire to secure by Letters Patent, is a bicycle lock-rest, as follows:

1. In combination with a bicycle having a support secured at or near the head of the fork of an arm or shoe, whereby, when in use, the machine is automatically and simultaneously supported and locked, substantially as and for the purposes specified.

2. In combination with a bicycle, a rest having a brace which can be shortened for adjustment on the machine when not in use as a support, and an extended arm to lock the machine when not in motion.

3. In combination with a bicycle, a shoe so attached to the arm or rest of a bicycle as to be adjusted at any angle with the arm, and so constructed as to automatically lock the machine when the arm or rest is in use and also automatically free the wheel from the pressure or friction of the lock when the bicycle arm or rest is not in use as a lock-rest, substantially as described.

4. In combination with a bicycle, a lock-rest, with a spring or other like devices so adjusted as to automatically throw the arm or rest into position for use when the arm is freed from the spring $w$, Fig. 5, which secures the arm when not in use, substantially as described.

5. In combination with a bicycle, a lock-rest, with a shoe, Fig. 7, spring, Fig. 13, and a spring $w$, Fig. 10, or other like devices for securing the lower end of the arm of the lock or rest when not in use as a lock-rest, substantially as and for the purposes set forth.

6. In combination with a bicycle having a support and lock, a strap-like device attached to the frame, and which is applied to brake-rod and handle-bar to lock the front wheel in position, substantially as described.

7. In combination with a bicycle, a support or rest which can be placed at any angle to the machine by means of an adjustable arm extending toward the wheel to which the support is connected, substantially as and for the purposes set forth.

JAMES L. LEEPER.

Witnesses:
J. B. FORMER,
C. H. WORDEN.